Jan. 29, 1946. C. E. GUERTIN 2,393,900
BEARING FOR DYNAMOS
Filed Nov. 24, 1942 2 Sheets-Sheet 1
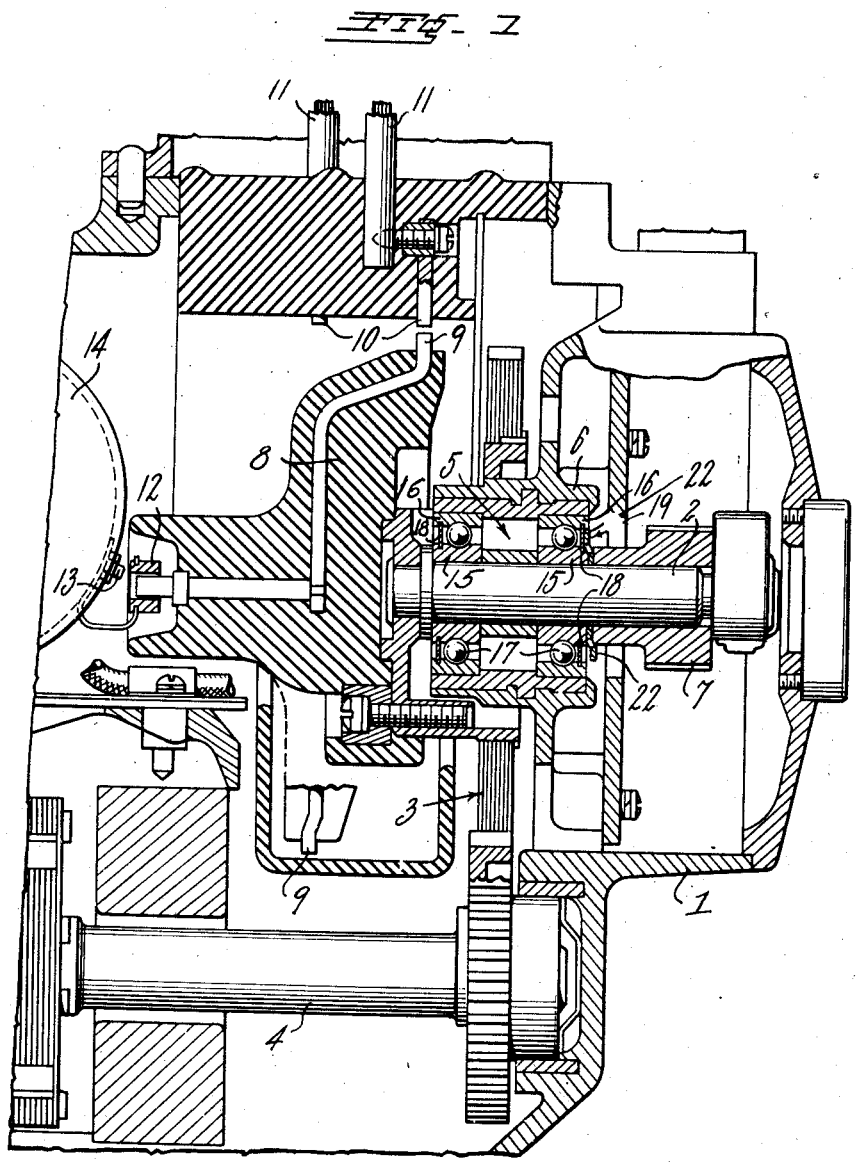
INVENTOR.
CHARLES E. GUERTIN
BY
ATTORNEY Jan. 29, 1946. C. E. GUERTIN 2,393,900
BEARING FOR DYNAMOS
Filed Nov. 24, 1942 2 Sheets-Sheet 2
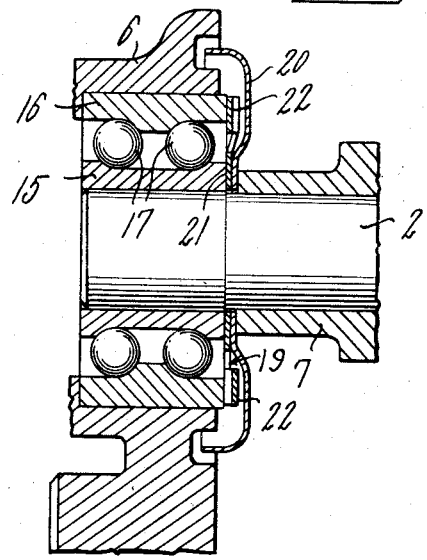
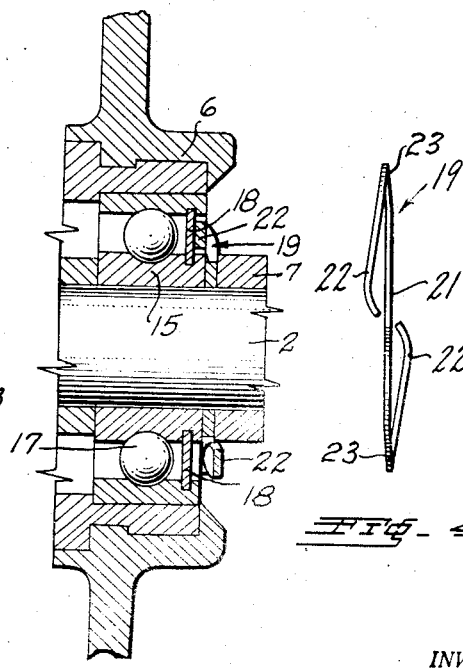
INVENTOR.
CHARLES E. GUERTIN
BY
ATTORNEY Patented Jan. 29, 1946

2,393,900

UNITED STATES PATENT OFFICE 2,393,900

BEARING FOR DYNAMOS

Charles E. Guertin, Springfield, Mass., assignor to American Bosch Corporation, Springfield, Mass., a corporation of New York Application November 24, 1942, Serial No. 466,743

6 Claims. (Cl. 184—1)

This invention relates to bearings for dynamos and particularly to electrical protectors thereof preventing or reducing the passage of electric current through the bearing of the generator or motor to thereby prevent deterioration of the lubricant and pitting of the bearing particularly in the case of anti-friction bearings. One exemplary application of the invention is to high tension ignition magnetos in which oscillatory currents of high frequency are electrostatically induced in the rotary distributor shaft journaled in a bearing.

The primary object of the invention is to provide a bearing having an electrical protector of this kind occupying but little axial length along the rotatable member of the dynamo, about the thickness of an ordinary shim, the protector rotating with the rotatable member in electrical connection therewith and including a member, preferably a spring or a resilient finger, in engagement with the stationary part of the bearing to thereby effectively short circuit the bearing therebetween. In application to a dynamo having an anti-friction bearing, whether of the ball, roller or needle type, this spring or other member is arranged in sliding engagement with the outer race of the bearing or with the oil retainer thereof or with any other stationary part associated therewith.

Another object is to provide in a bearing an electrical protector of this kind which has two fingers axially offset in opposite axial directions so that one or the other finger engages a stationary part of the bearing in either reverse position in which the protector may be installed on the rotatable member. Where the rotatable member is a shaft, this protector is preferably in the form of an integral washer stamped from flat spring stock in such form that the fingers extend circumferentially in the same direction from opposite junctures with an inner ring which they overlie and which surrounds the shaft.

Still another object is to provide a protector of this kind which is of simple, inexpensive and resilient construction and which is readily installed both in manufacture and in service of the dynamo and is continually effective over long periods of severe service.

Other objects and advantages of the invention will be apparent from the following description of the invention in application, as an example, to the distributor shaft mounted in a ball bearing of a multicylinder high tension magneto of the internally geared type having a stationary generator coil. In the accompanying drawings, Fig. 1 shows a part of the magneto with a bearing of the invention wherein the electrical protector is installed therein in sliding engagement with an oil retainer for the bearing; Fig. 2 shows, in larger scale, a ball bearing having the spring finger of the protector in sliding engagement with an outer race of the bearing; Fig. 3 shows a face view of the preferred form of the protector alone; Fig. 4 shows the same in side or edge view; and Fig. 5 is a fragmentary view of Fig. 1 on an enlarged scale.

Referring to Fig. 1, a well known multicylinder magneto of this kind with frame 1 has a distributor shaft 2 driven through appropriate internal gearing 3 from the magnetic rotor shaft 4 which is driven by an associated internal combustion engine. The shaft 2 is journaled in the double ball bearing 5 mounted in the bearing support 6 and carries at one end the cam 7 of the breaker mechanism and at the other end a distributor rotor 8 with an electrode 9 sequentially cooperative with the stationary electrodes as 10 connected by wires as 11 with the sparkplugs of the engine in the well known manner. The electrode 9 is connected through the gap connector 12 with the high tension terminal 13 of the generating coil 14 having primary and secondary windings. The bearing 5 has rotatable inner races 15 fast with shaft 2 and stationary outer races 16 fast with the support 6. The bearing also has the balls 17 between the races, and the oil retainers 18 fast with the outer races. The protector 19 is held fast around the shaft 2, between the cam 7 and an inner race 15 of the bearing, so as to be electrically connected to the inner race and the shaft.

In Fig. 1 the protector is in sliding engagement with an oil retainer 18, and in Fig. 2 with an outer race 16 of the bearing having an oil slinger 20, so that in each case the balls 17 between the inner and outer races of both parts of the bearing are electrically short circuited by the protector.

As shown particularly in Figs. 3 and 4, the protectors 19 of Figs. 1 and 2 are in the form of a washer stamped in one piece from flat spring stock of beryllium copper, and are axially thin about equal to that of an ordinary shim used in magnetos. The washer comprises an inner ring 21 surrounding the shaft 2 and has two arcuate fingers 22 extending circumferentially in the same direction from opposite junctures 23 so as to form resilient fingers overlying the inner ring. These fingers are axially offset in opposite directions, so that one or the other of them maintains resilient contact with a fixed part of the bearing no matter in which reverse way the washer is installed on the shaft 2, thereby making it impossible for the washer to be installed without being electrically connected directly to the inner and outer races, so as to effectively short circuit the balls of the bearing and the oil or grease therein. Thus the oscillatory currents of high frequency which are electrostatically induced in the shaft 2 from the electrode 9 of the distributor rotor, or from any other part connected to the high tension terminal 13 of the coil, are prevented from passing through the balls, or at least the current passing therethrough is considerably reduced, so that the deterioration of the lubricant due to carbonization or otherwise, and the pitting of the balls, are precluded or reduced to a negligible extent. By arranging the washer directly across the inner and outer races of the bearing, not only is the electrical short circuit made more direct, effective and with minimum normal resistance to better prevent the passage of oscillatory currents through the balls and the lubricant in which they run, but the comparatively large area of the washer and its proximity to the stationary part of the bearing provide a large capacitance between them which assists in quickly and effectively breaking down any intervening path of oil or grease seeping or vaporizing out of the bearing.

If desired, a similar washer may be installed on the other or both sides of the bearing. Furthermore, washers of this general kind may be applied to roller or needle bearings in which case the protective action required is less on account of the more extensive distribution of the current through the rollers or needles, and also may be applied to plain bearings in which case the protective action required is still less. In all cases, it will be observed that the washer has about the actual thickness of an ordinary shim used in dynamos to take up the axial play of the shaft in its bearings, and may readily be substituted therefor to provide protection of this kind not originally present. Furthermore, the washer may be installed in the field with the use of ordinary service tools as a replacement or substitute part.

It will be understood that many variations may be made in the size and form of the washers herein disclosed, both integrally as well as in several parts, without departing from the spirit of the invention, and may be held in place against the bearing in any suitable way by any rotatable device or may be carried by gears or other devices mounted for rotation on stationary shafts or spindles with bearings therebetween. Furthermore, the protectors may be used with magnetos of any appropriate kind whether internally geared or gearless types, and in the former case whether the breaker cam is mounted on the distributor shaft or the magnetic rotor shaft. In fact, the protectors may be used with generators other than magnetos, or with electric motors, in which, in some cases, the electric current in the shaft is electrostatically induced therein as herein shown or flows directly therein as in the transitional periods in the operation of repulsion-induction motors. These and other modifications and uses of the invention are intended to be included within the broad terms of the appended claims.

Having thus described my invention, what I claim is:

1. In a bearing for a rotatable member of a dynamo, an axially-thin shim-like electrical protector which is carried by the rotatable member in electrical connection therewith and which has a portion constructed and arranged to slidably engage a stationary part of the bearing, said shim-like protector being adapted to act both as a shim for taking up play of the rotatable member in its bearing and to electrically connect the rotatable member and stationary part of the bearing.

2. In a bearing for a rotatable member of a dynamo, an axially-thin shim-like electrical protector which is carried by the rotatable member so as to be electrically connected thereto and which has a finger resiliently and slidably engaging a stationary part of the bearing, said shim-like protector being adapted to act both as a shim for taking up play of the rotatable member in its bearing and to electrically connect the rotatable member and stationary part of the bearing.

3. In an anti-friction bearing having inner and outer races for a rotatable member of a dynamo, an axially-thin shim-like electrical protector which is carried by the rotatable member in electrical connection with the inner race and which has a finger slidably engaging the outer race of the bearing, said shim-like protector being adapted to electrically connect the inner race and outer race of the bearing and thereby reduce the current passing through the bearing between said inner and outer races.

4. In an anti-friction bearing having inner and outer races for a rotatable member of a dynamo, an oil retainer electrically connected to the outer race, and an axially-thin shim-like electrical protector which is carried by the rotatable member and electrically connected to the inner race and which has a finger slidably engaging the oil retainer, said shim-like protector being adapted to electrically connect said inner race and said oil retainer and thereby reduce the current passing through the bearing between said inner and outer races.

5. In a bearing for a rotatable shaft of a dynamo, an electrical protector for the bearing comprising an axially-thin shim-like washer which is carried by the shaft in electrical connection therewith and which has an inner ring surrounding the shaft and an arcuate finger extending from the ring and being axially offset from it to slidably engage a stationary part of the bearing, said shim-like washer being adapted to form an electrical connection between said shaft and a stationary part of the bearing and thereby reduce the current passing through said bearing between said shaft and said stationary part of the bearing.

6. In a bearing for a rotatable shaft of a dynamo, an electrical protector for the bearing comprising an axially-thin shim-like spring washer which is carried by the shaft in electrical connection therewith and which has an inner ring surrounding the shaft and an arcuate finger extending integrally from and overlying the ring and being axially offset from it to slidably engage a stationary part of the bearing, said shim-like washer being adapted to form an electrical connnection between said shaft and a stationary part of the bearing and thereby reduce the current passing through said bearing between said shaft and said stationary part of the bearing.

CHARLES E. GUERTIN.